(12) United States Patent
Morii

(10) Patent No.: US 10,756,539 B2
(45) Date of Patent: Aug. 25, 2020

(54) ELECTRONIC APPARATUS AND CONTROL METHOD THEREOF

(71) Applicant: CANON KABUSHIKI KAISHA, Tokyo (JP)

(72) Inventor: Takashi Morii, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 15/850,346

(22) Filed: Dec. 21, 2017

(65) Prior Publication Data

US 2018/0183234 A1 Jun. 28, 2018

(30) Foreign Application Priority Data

Dec. 28, 2016 (JP) .................................. 2016-256764

(51) Int. Cl.
| | | |
|---|---|---|
| *H02H 9/04* | (2006.01) | |
| *H02H 7/18* | (2006.01) | |
| *H02H 7/00* | (2006.01) | |
| *H02J 7/00* | (2006.01) | |

(52) U.S. Cl.
CPC .............. *H02H 9/044* (2013.01); *H02H 7/18* (2013.01); *H02J 7/00* (2013.01); *H02J 7/0029* (2013.01)

(58) Field of Classification Search
CPC ......... H02H 7/18; H02H 9/044; H02J 7/0029; H02J 7/0052; H02J 2007/0062
USPC ...................................................... 361/91.7
See application file for complete search history.

(56) References Cited

U.S. PATENT DOCUMENTS

| | | |
|---|---|---|
| 2010/0073837 A1 | 3/2010 | Predtetchenski |
| 2016/0190794 A1 | 6/2016 | Forghani-Zadeh |
| 2017/0126041 A1 | 5/2017 | Sato |
| 2017/0279270 A1 * | 9/2017 | Motoki ................. H01B 11/02 |
| 2018/0060201 A1 * | 3/2018 | Newberry ............. G06F 1/3206 |

FOREIGN PATENT DOCUMENTS

| | | |
|---|---|---|
| JP | 2002-176138 | 6/2002 |
| JP | 2006-48594 | 2/2006 |
| JP | 2012-81665 A | 4/2012 |
| JP | 2015-8582 A | 1/2015 |
| WO | 2016/013451 | 1/2016 |

OTHER PUBLICATIONS

Japanese Office Action dated Sep. 27, 2019 during prosecution of related Japanese application No. 2016-256764. (English-language machine translation included.).

\* cited by examiner

*Primary Examiner* — Kevin J Comber
(74) *Attorney, Agent, or Firm* — Venable LLP

(57) ABSTRACT

An electronic apparatus includes a first terminal that receives power supplied from an external apparatus, a second terminal that is used to determine a power supply capability of an external apparatus, an internal circuit that includes a communication control unit that communicates with an external apparatus via the second terminal, a capacitor that forms an AC coupling between the internal circuit and the second terminal, a route that bypasses the capacitor, a switch that causes the route to switch to a conductive state or a non-conductive state, and a control unit that controls the switch by determining whether a first voltage applied to the first terminal by the external apparatus exceeds a second voltage which can be applied to the internal circuit via the second terminal.

20 Claims, 9 Drawing Sheets

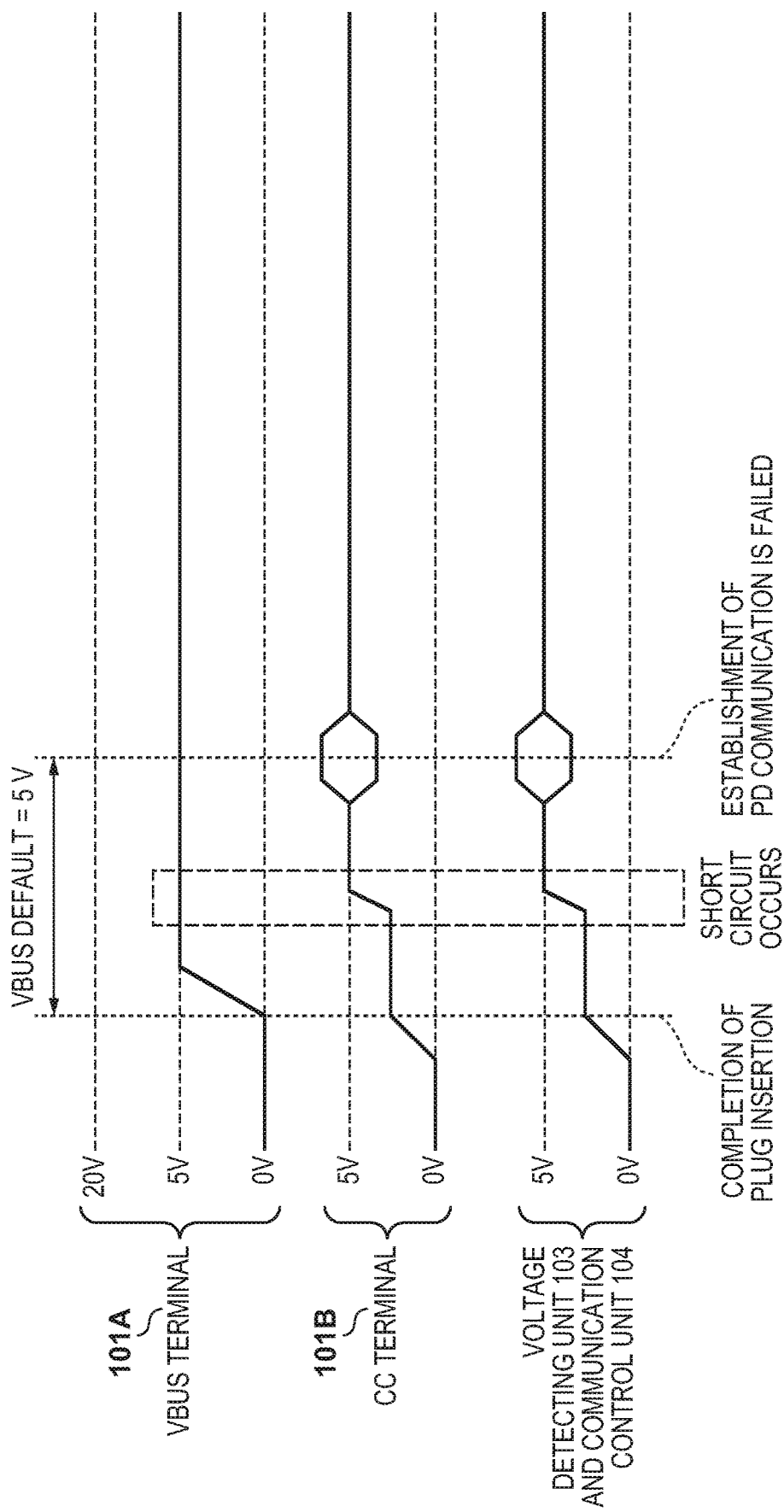

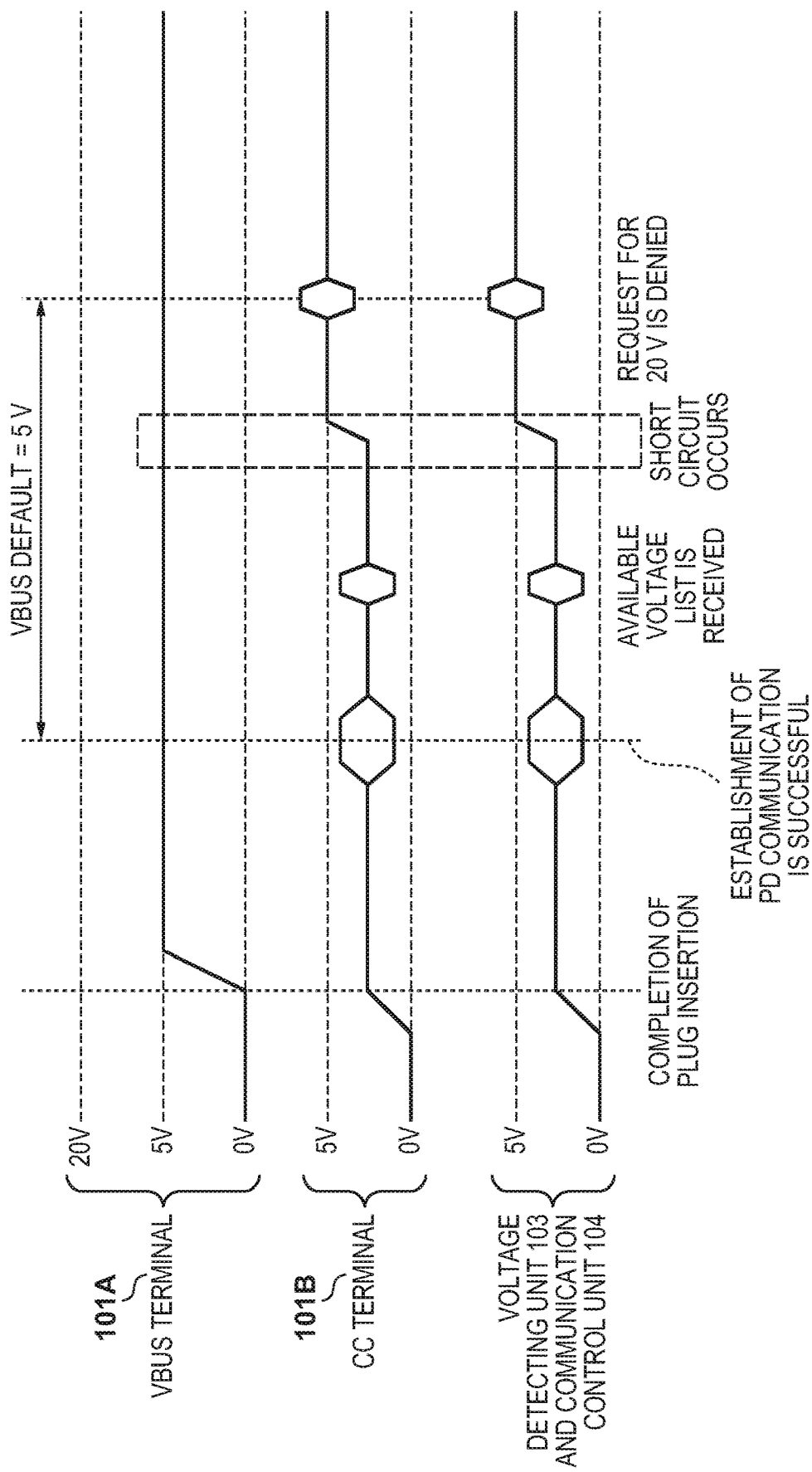

ELECTRONIC APPARATUS AND CONTROL METHOD THEREOF

BACKGROUND

Field of the Invention

Aspects of the present inventions generally relate to an electronic apparatus capable of protecting its internal circuit from an overvoltage and a control method thereof.

Description of the Related Art

As standards that implement the supply of power from a power supply apparatus to an electronic apparatus via a USB (Universal Serial Bus), USB 2.0 standard, USB 3.1 standard, USB BC (Battery Charging) standard, USB Type-C standard, and USB PD (Power Delivery) standard are known.

When an electronic apparatus is compliant with the USB Type-C standard and the USB PD standard, the maximum value of a voltage applied to a VBUS terminal of the electronic apparatus via a USB Type-C cable changes in accordance with whether the power supply apparatus is compliant with the USB PD standard. If the power supply apparatus is not compliant with the USB PD standard, the maximum value of a voltage applied to the VBUS terminal of the electronic apparatus via the USB Type-C cable is restricted to 5 V. On the other hand, if the power supply apparatus is compliant with the USB PD standard, the maximum value of a voltage to be applied to the VBUS terminal of the electronic apparatus via the USB Type-C cable is restricted to 20 V.

A pin arrangement of a USB Type-C connector (receptacle) included in an apparatus complying with the USB Type-C standard is shown in FIG. 7. A pin A4 or B4 is a VBUS terminal which is used to supply power from a power supply apparatus to the electronic device. A pin A5 or B5 is a CC (Configuration Channel) terminal used for the notification the power supply capability of the power supply apparatus. A USB Type-C cable plug is connected to the receptacle shown in FIG. 7.

As is obvious from the pin arrangement of FIG. 7, the VBUS terminal (pin A4 or B4) and the CC terminal (pin A5 or B5) are next to each other. Hence, there is a concern that the voltage applied to the VBUS terminal will also be applied to the CC terminal if the plug and the receptacle are displaced by an outside physical pressure and a short circuit occurs between the VBUS terminal and the CC terminal.

A circuit which is included in an electronic apparatus and is connected to a CC terminal is referred to as an "internal circuit". The maximum value of a voltage that the power supply apparatus can apply to the internal circuit via the CC terminal is called an "allowable voltage". In general, the allowable voltage of the internal circuit is about 5 V. Hence, if a short circuit occurs between the CC terminal and another terminal (e.g., the VBUS terminal) when the power supply apparatus is in compliance with the USB PD standard, the internal circuit may be damaged because a voltage (overvoltage) that exceeds the allowable voltage of the internal circuit will be applied to the internal circuit via the CC terminal. As a method to protect the internal circuit connected to the CC terminal, the allowable voltage of the internal circuit may be increased to a voltage exceeding 20 V. However, this method will problematically increase the cost of the internal circuit.

Japanese Patent Laid-Open No. 2012-81665 and Japanese Patent Laid-Open No. 2015-8582 each disclose an apparatus that includes a connector to which a USB cable can be connected. Japanese Patent Laid-Open No. 2012-81665 discloses an apparatus that controls the conductive state of the second wiring line by whether the potential difference between the first wiring line and the second wiring line is within an allowable range. Japanese Patent Laid-Open No. 2015-8582 discloses an apparatus that notifies a user of the occurrence of a short circuit in the connector.

However, the CC terminal is not disclosed in either of Japanese Patent Laid-Open No. 2012-81665 and Japanese Patent Laid-Open No. 2015-8582. Hence, neither Japanese Patent Laid-Open No. 2012-81665 nor Japanese Patent Laid-Open No. 2015-8582 solves the problem of the breakdown of the internal circuit connected to the CC terminal due to an overvoltage generated by a short circuit between the CC terminal and another terminal (e.g., the VBUS terminal).

SUMMARY

According to an aspect of the present invention, at least one of the above-described drawbacks and disadvantages can be overcome.

According to an aspect of the present invention, it is possible to protect an internal circuit that is connected to a CC terminal from an overvoltage generated by a short circuit between the CC terminal and another terminal (e.g., a VBUS terminal).

According to an aspect of the present invention, there is provided an electronic apparatus comprising: a first terminal that receives power supplied from an external apparatus; a second terminal that is used to determine a power supply capability of an external apparatus; an internal circuit that includes a communication control unit that communicates with an external apparatus via the second terminal; a capacitor that forms an AC coupling between the internal circuit and the second terminal; a route that bypasses the capacitor; a switch that causes the route to switch to a conductive state or a non-conductive state; and a control unit that controls the switch by determining whether a first voltage applied to the first terminal by the external apparatus exceeds a second voltage which can be applied to the internal circuit via the second terminal.

According to an aspect of the present invention, there is provided a method comprising: causing a second terminal of an electronic apparatus and an internal circuit of the electronic apparatus to be conductive and determining a first voltage to be applied to a first terminal of the electronic apparatus by an external apparatus, wherein the electronic apparatus includes the first terminal, the second terminal, and the internal circuit, the first terminal is used by the electronic apparatus to receive power supplied from the external apparatus, the second terminal is used by the electronic apparatus to determine a power supply capability of the external device, and the internal circuit includes a communication control unit that communicates with the external apparatus via the second terminal; determining whether the first voltage applied to the first terminal by the external apparatus exceeds a second voltage that can be applied to the internal circuit via the second terminal; controlling, when the first voltage does not exceed the second voltage, a switch so as to maintain a conductive state of a route used to bypass a capacitor which forms an AC coupling between the internal circuit and the second terminal, wherein the switch is used to cause the route to switch to the conductive state or a non-conductive state; and controlling, when the first voltage exceeds the second voltage, the switch so as to set the route to the non-conductive state.

Further features and aspects of the present invention will become apparent from the following description of exemplary embodiments.

BRIEF DESCRIPTION OF THE DRAWINGS

FIG. 3A is a timing chart for illustrating an exemplary operation of the electronic apparatus 100 when a short circuit occurs in a period T1.

FIG. 3B is a timing chart for illustrating an exemplary operation of the electronic apparatus 100 when a short circuit occurs in a period T2;

DESCRIPTION OF THE EMBODIMENTS

Exemplary embodiments, features, and aspects of the present invention will be described below with reference to the drawings. However, aspects of the present invention are not limited to the following exemplary embodiments.

First Embodiment

The first embodiment will be described with reference to FIGS. 1, 2, 3A, 3B, 3C, and FIG. 7.

Figure 1:
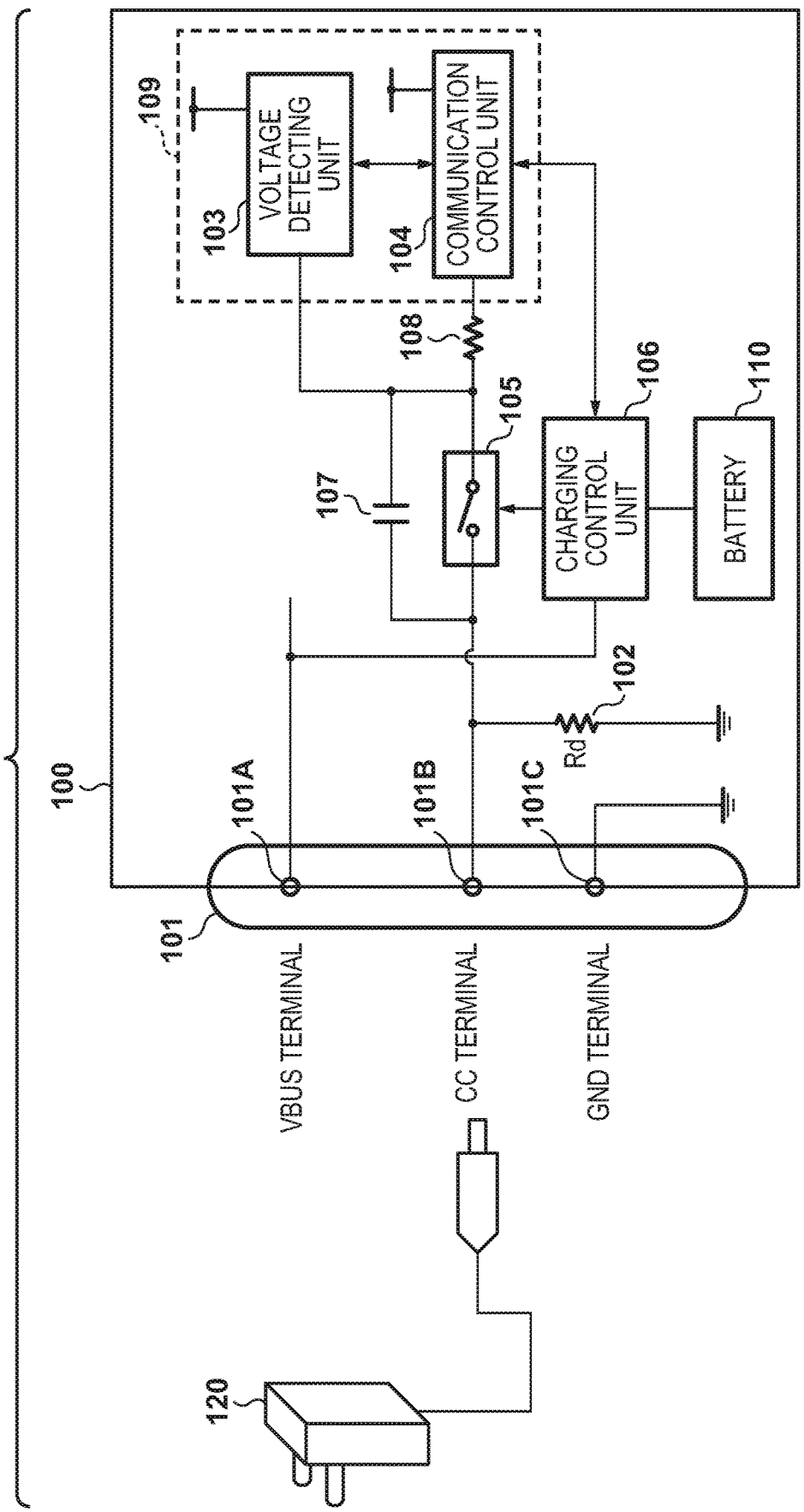
FIG. 1 is a block diagram for illustrating an exemplary arrangement of an electronic apparatus 100 according to a first embodiment.
Figure 2:
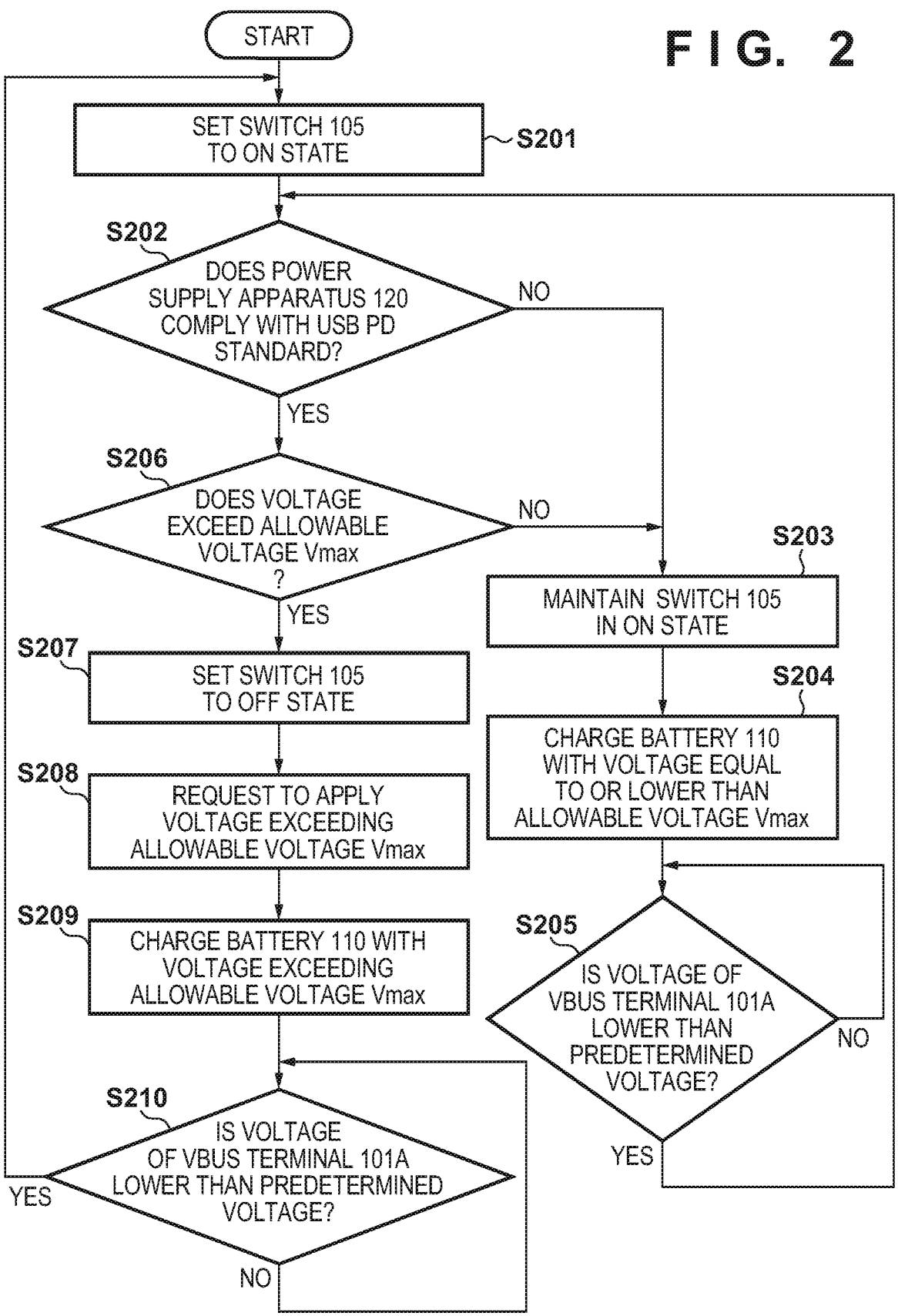
FIG. 2 is a flowchart for illustrating an exemplary operation of the electronic apparatus 100 according to the first embodiment.
Figure 3C:
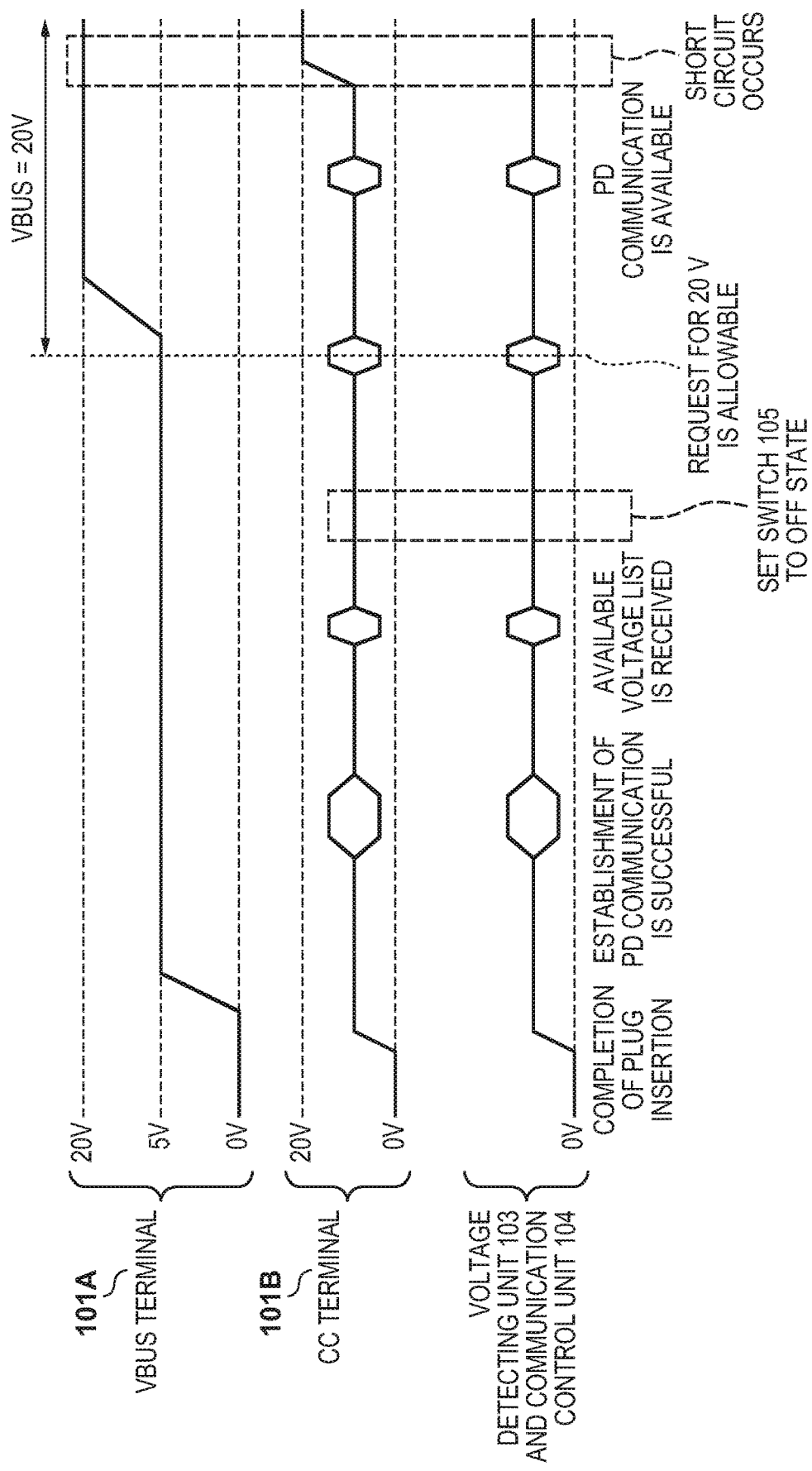
FIG. 3C is a timing chart for illustrating an exemplary operation of the electronic apparatus 100 when a short circuit occurs in a period T3.

FIG. 1 is a block diagram for illustrating an exemplary arrangement of an electronic apparatus 100 according to the first embodiment. FIG. 2 is a flowchart for illustrating an exemplary operation of the electronic apparatus 100. FIGS. 3A, 3B, and 3C are timing charts for illustrating exemplary operations of the electronic apparatus 100.

In FIG. 1, a power supply apparatus 120 is an external apparatus that operates as a power supply source of the electronic apparatus 100. The first embodiment will describe an example in which the power supply apparatus 120 operates as an USB-AC adapter. However, the power supply apparatus 120 is not limited to the USB-AC adapter and may be a USB host apparatus (such as a personal computer) or a USB battery. The USB-AC adapter is an apparatus that can supply power received from an external AC power to an external electronic apparatus via a USB cable or a USB Type-C cable. The USB battery is a battery that can supply power obtained from one or more battery cells to the external electronic apparatus via the USB cable or the USB Type-C cable.

In the first embodiment, each of the power supply apparatus 120 and the electronic apparatus 100 is an apparatus complying with the USB Type-C standard and includes a USB Type-C connector (receptacle). The power supply apparatus 120 and the electronic apparatus 100 are connected via a USB Type-C cable. The power supply apparatus 120 can supply power to the electronic apparatus 100 via the USB Type-C cable, and the electronic apparatus 100 can receive power from the power supply apparatus 120 via the USB Type-C cable. The electronic apparatus 100 is also an apparatus in compliance with the USB PD standard.

The electronic apparatus 100 can operate, for example, as an image capture apparatus (a digital camera or a digital video camera), a mobile apparatus, or a mobile phone. The electronic apparatus 100 includes, as shown in FIG. 1, a connector 101, a pull-down resistor 102, a voltage detecting unit 103, a communication control unit 104, a switch 105, a charging control unit 106, a capacitor 107, a suppressing resistor 108, an internal circuit 109, and a battery 110. The connector 101, the pull-down resistor 102, the voltage detecting unit 103, the communication control unit 104, the switch 105, the charging control unit 106, the capacitor 107, and the suppressing resistor 108 each have a hardware arrangement. The communication control unit 104 includes a memory that stores one or more programs and one or more microprocessors that execute the one or more programs. The charging control unit 106 also includes a memory that stores one or more programs and one or more microprocessors that execute the one or more programs. The battery 110 is the power source of the electronic apparatus 100 and is detachable from the electronic apparatus 100.

The internal circuit 109 is a circuit included in the electronic apparatus 100 and is connected to a CC terminal. The internal circuit 109 includes at least the voltage detecting unit 103 and the communication control unit 104. The maximum value of a voltage that can be applied to the internal circuit 109 by the power supply apparatus 120 via a CC terminal 101B is called an "allowable voltage Vmax". The allowable voltage Vmax is, for example, about 7 V to 10 V. If a voltage (overvoltage) exceeding the allowable voltage Vmax is applied to the internal circuit 109 via the CC terminal 101B, one or both of the voltage detecting unit 103 and the communication control unit 104 may be damaged by the overvoltage.

Figure 7:
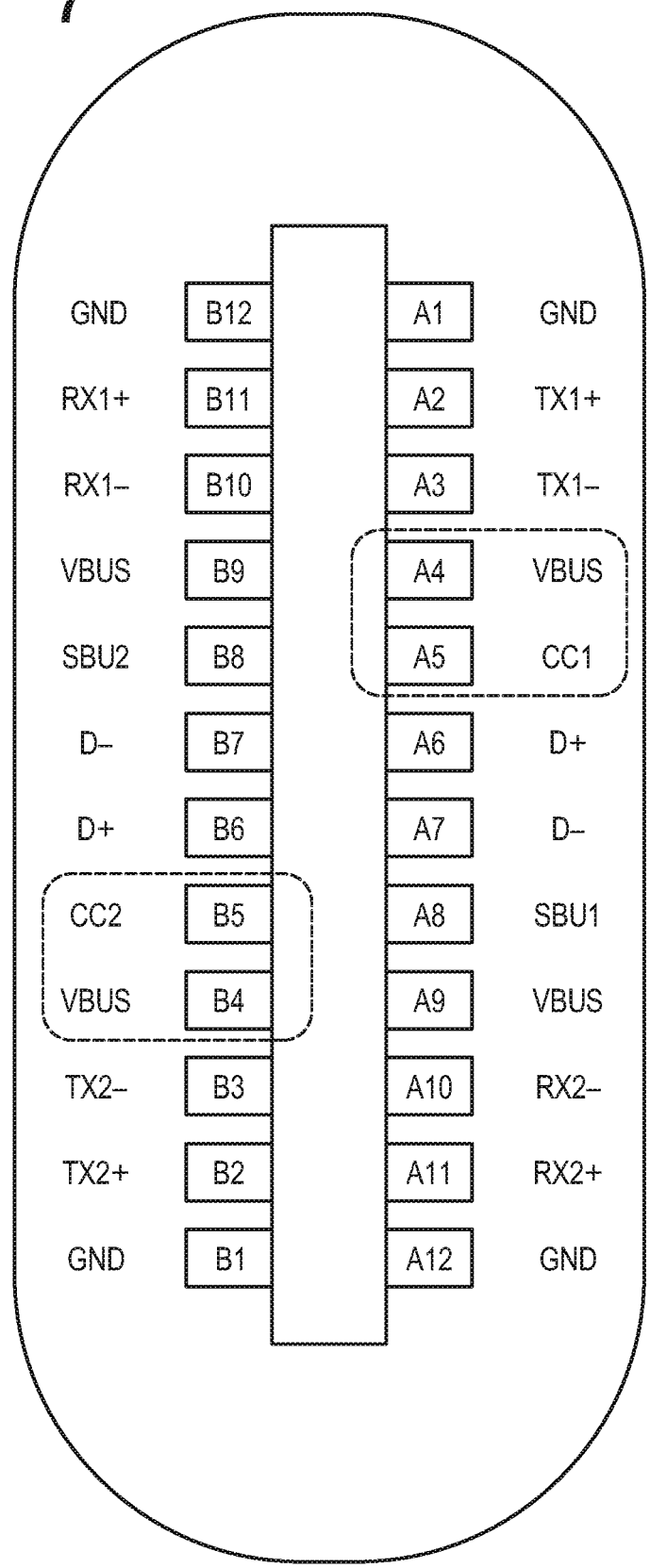
FIG. 7 is a view showing a pin arrangement of a USB Type-C connector (receptacle).

The connector 101 is a USB Type-C connector (receptacle) included in the electronic apparatus 100 and is an interface unit to which the plug of a USB Type-C cable is connected. The pin arrangement of the connector 101 is as shown in FIG. 7. The connector 101 includes 24 pins (pins A1 to A12 and pins B1 to B12) shown in FIG. 7. The pin A4 or B4 is a VBUS terminal 101A used to supply power from the power supply apparatus 120 to the electronic apparatus 100. The pin A5 or B5 is the CC terminal 101B used to determine the power supply capability of the power supply apparatus 120. The pin A1 or B1 is a ground (GND) terminal 101C. When the power supply apparatus 120 and the electronic apparatus 100 are connected via the USB Type-C cable, power supplied from the power supply apparatus 120 is supplied to the voltage detecting unit 103, the communication control unit 104, the charging control unit 106, and the other components via the VBUS terminal 101A.

The pull-down resistor 102 is a resistor defined by the USB Type-C standard and is connected between the CC terminal 101B and ground. The pull-down resistor 102 is used to detect that the power supply apparatus 120 has been connected to the electronic apparatus 100.

The capacitor 107, a bypass route BP for bypassing the capacitor 107, the switch 105 to switch between the conductive state and the non-conductive state of the bypass route BP, and the suppressing resistor 108 have been provided between the CC terminal 101B and the internal circuit 109. The capacitor 107 and the switch 105 are connected in parallel to each other. The state of the switch 105 is controlled by the charging control unit 106.

The capacitor 107 is a capacitor which is used to form an AC coupling between the CC terminal 101B and the internal circuit 109 and can block a DC signal component supplied from the CC terminal 101B to the internal circuit 109.

When the charging control unit 106 sets the switch 105 to an on state, the switch 105 sets the bypass route BP to a conductive state. When the bypass route BP is set to the conductive state, a DC coupling is formed between the CC terminal 101B and the internal circuit 109, and a state in which the capacitor 107 is bypassed by the bypass route BP is started.

When the charging control unit 106 sets the switch 105 to an off state, the switch 105 sets the bypass route BP to a non-conductive state. When the bypass route BP is set to the non-conductive state, the DC coupling between the CC terminal 101B and the internal circuit 109 is disconnected, thereby ending the state in which the capacitor 107 is bypassed by the bypass route BP.

For example, when the power switch of the electronic apparatus 100 is set to the on state and power supplied from the battery 110 is supplied to the voltage detecting unit 103, the communication control unit 104, the charging control unit 106, and the other components, the charging control unit 106 sets the switch 105 from the off state to the on state.

For example, when requesting the power supply apparatus 120 to apply a voltage exceeding the allowable voltage Vmax (e.g., about 7 V to 10 V) to the VBUS terminal 101A, the communication control unit 104 instructs the charging control unit 106 to set the switch 105 to the off state. Upon receiving this instruction, the charging control unit 106 sets the switch 105 from the on state to the off state.

For example, when the power switch of the electronic apparatus 100 is set to the off state, the charging control unit 106 sets the switch 105 from the on state to the off state. For example, if the power supply apparatus 120 stops supplying power, the charging control unit 106 sets the switch 105 from the on state to the off state. For example, if the power supply apparatus 120 is detached from the connector 101, the charging control unit 106 sets the switch 105 from the on state to the off state.

The voltage detecting unit 103 is connected to the CC terminal 101B via the switch 105 and the capacitor 107. The voltage detecting unit 103 detects the voltage (DC voltage) applied to the CC terminal 101B by the power supply apparatus 120 when the switch 105 is set to the on state and the power supply apparatus 120 is not an external apparatus complying with the USB PD standard. The value indicating the voltage detected by the voltage detecting unit 103 is notified to the communication control unit 104. If the power supply apparatus 120 is not an external apparatus complying with the USB PD standard, the power supply apparatus 120 is an external apparatus complying with the USB Type-C standard. In the USB Type-C standard, the power supply capability of the power supply apparatus 120 can be determined from the voltage (DC voltage) applied to the CC terminal 101B by the power supply apparatus 120. Hence, detecting the voltage applied to the CC terminal 101B is important for the USB Type-C standard.

The communication control unit 104 is also connected to the CC terminal 101B via the switch 105 and the capacitor 107 in the same manner as the voltage detecting unit 103. The communication control unit 104 can operate as a communication control unit that performs communication in compliance with the USB PD standard. The communication control unit 104 can determine whether the power supply apparatus 120 is an external apparatus complying with the USB PD standard by performing communication complying with the USB PD standard. If the power supply apparatus 120 is an external apparatus complying with the USB PD standard, the communication control unit 104 can determine, by performing the communication complying with the USB PD standard, the power supply capability of the power supply apparatus 120. If the power supply apparatus 120 is not an external apparatus complying with the USB PD standard, the communication control unit 104 can determine the power supply capability of the power supply apparatus 120 from the voltage detected by the voltage detecting unit 103.

The charging control unit 106 can charge the battery 110 by power supplied from the power supply apparatus 120 to the charging control unit 106 via the VBUS terminal 101A. Hence, it is possible for the charging control unit 106 to tolerate an applied voltage which exceeds 20 V. After the power supply capability of the power supply apparatus 120 is determined by the communication control unit 104, the battery 110 is charged at a voltage equal to or lower than the allowable voltage Vmax or at a voltage exceeding the allowable voltage Vmax.

The suppressing resistor 108 is a resistor to suppress the inrush current that flows to the communication control unit 104 via the CC terminal 101B and the bypass route BP in a period when the switch 105 is set to the on state. In a period when the switch 105 is set to the on state (a period when a DC coupling is formed between the internal circuit 109 and the CC terminal 101B), the communication control unit 104 can be protected by the suppressing resistor 108.

Note that the arrangement which has been added to protect the internal circuit 109 of the electronic apparatus 100 is formed by the switch 105, the charging control unit 106, the capacitor 107, and the suppressing resistor 108.

Next, an exemplary operation of the electronic apparatus 100 according to the first embodiment will be described with reference to the flowchart of FIG. 2. The flowchart of FIG. 2 is started when the power switch of the electronic apparatus 100 is set to the on state and power supplied from the battery 110 is supplied to the voltage detecting unit 103, the communication control unit 104, the charging control unit 106, and the other components.

In step S201, the charging control unit 106 sets the switch 105 from the off state to the on state. When the switch 105 is set to the on state, the bypass route BP between the CC terminal 101B and the internal circuit 109 is set to the conductive state, thus forming a DC coupling between the CC terminal 101B and the voltage detecting unit 103 and a DC coupling between the CC terminal 101B and the communication control unit 104. As a result, a bypass state in which the capacitor 107 is bypassed by the bypass route BP is set, and the voltage detecting unit 103 is set to a state in which it can detect the voltage (DC voltage) applied to the CC terminal 101B by the power supply apparatus 120. On the other hand, the communication control unit 104 is set to a state protected from the inrush current by the suppressing resistor 108.

In step S202, the communication control unit 104 determines, by performing communication complying with the USB PD standard, whether the power supply apparatus 120 connected to the connector 101 is an external apparatus complying with the USB PD standard. Note that this communication is performed via the CC terminal 101B. Whether the power supply apparatus 120 is an external apparatus complying with the USB PD standard is determined by the communication control unit 104 in accordance with a predetermined communication protocol of the USB PD standard. Whether the power supply apparatus 120 which is connected to the connector 101 is an external apparatus complying with the USB PD standard is notified from the communication control unit 104 to the charging control unit 106.

If it is determined that the power supply apparatus 120 is not an external apparatus complying with the USB PD standard (NO in step S202), the charging control unit 106 maintains the switch 105 in the on state (step S203). Note that if the power supply apparatus 120 is not an external apparatus complying with the USB PD standard, the voltage applied to the VBUS terminal 101A by the power supply apparatus 120 is restricted to 5 V or less since the power supply apparatus 120 is an external apparatus complying with the USB Type-C standard. Hence, even if a short circuit occurs between the VBUS terminal 101A and the CC terminal 101B in a period T1, the voltage detecting unit 103 and the communication control unit 104 are safe because a voltage applied to the internal circuit 109 via the CC terminal 101B and the bypass route BP will not exceed the allowable voltage Vmax (e.g., about 7 V to 10 V).

If the power supply apparatus 120 is not an external apparatus complying with the USB PD standard, the power supply apparatus 120 is an external apparatus complying with the USB Type-C standard. In the USB Type-C standard, the power supply capability of the power supply apparatus 120 can be determined from the voltage (DC voltage) applied to the CC terminal 101B by the power supply apparatus 120. Here, if the AC coupling between the CC terminal 101B and the internal circuit 109 is effective, the voltage detecting unit 103 cannot detect the correct DC voltage. Hence, if it is determined that the power supply apparatus 120 is not an external apparatus complying with the USB PD standard (NO in step S202), the charging control unit 106 maintains the switch 105 in the on state (step S203). As a result, since the capacitor 107 is bypassed by the bypass route BP, the voltage detecting unit 103 can correctly detect the voltage (DC voltage) applied to the CC terminal 101B by the power supply apparatus 120.

In step S203, the voltage detecting unit 103 detects the voltage (DC voltage) applied to the CC terminal 101B by the power supply apparatus 120. A value indicating the voltage detected by the voltage detecting unit 103 is notified to the communication control unit 104. If the power supply apparatus 120 is not an external apparatus complying with the USB PD standard, the communication control unit 104 can determine the power supply capability of the power supply apparatus 120 from the voltage detected by the voltage detecting unit 103.

In step S204, the charging control unit 106 charges the battery 110 with a voltage equal to or lower than the allowable voltage Vmax until the battery 110 changes to a fully charged state or until some kind of abnormality is detected. The voltage applied by the power supply apparatus 120 to the VBUS terminal 101A will not exceed the allowable voltage Vmax during the charging operation in step S204. Hence, even if a short circuit occurs between the VBUS terminal 101A and the CC terminal 101B, the voltage detecting unit 103 and the communication control unit 104 are safe because the voltage applied to the internal circuit 109 via the CC terminal 101B and the bypass route BP will not exceed the allowable voltage Vmax.

In step S205, the charging control unit 106 determines whether the voltage of the VBUS terminal 101A has become lower than a predetermined voltage. If it is determined that the voltage of the VBUS terminal 101A has not become lower than the predetermined voltage (NO in step S205), the charging control unit 106 determines that the power supply is being maintained by the power supply apparatus 120, and the process returns to step S205 after a predetermined time has elapsed. If it is determined that the voltage of the VBUS terminal 101A has become lower than the predetermined voltage (YES in step S205), the charging control unit 106 determines that the power supply apparatus 120 has been detached from the connector 101, and advances to step S202. The charging control unit 106 notifies the communication control unit 104 that the power supply apparatus 120 has been detached from the connector 101.

If it is determined that the power supply apparatus 120 is an external apparatus complying with the USB PD standard (YES in step S202), the communication control unit 104 determines, by performing communication complying with the USB PD standard, the voltage to be applied to the VBUS terminal 101A by the power supply apparatus 120 (step S206). The communication control unit 104 notifies the charging control unit 106 of the voltage determined in step S206. If the power supply apparatus 120 is an external apparatus complying with the USB PD standard, the maximum voltage that the power supply apparatus 120 can apply to the VBUS terminal 101A is 20 V. Hence, depending on the power supply capability or the operation state of the power supply apparatus 120, the voltage to be applied by the power supply apparatus 120 to the VBUS terminal 101A may exceed the allowable voltage Vmax.

If the voltage determined in step S206 does not exceed the allowable voltage Vmax (NO in step S206), the charging control unit 106 maintains the switch 105 in the on state (step S203). If the voltage determined in step S206 does not exceed the allowable voltage Vmax, the voltage applied to the VBUS terminal 101A by the power supply apparatus 120 is restricted to a voltage that does not exceed the allowable voltage Vmax. Hence, even if a short circuit occurs between the VBUS terminal 101A and the CC terminal 101B, the voltage detecting unit 103 and the communication control unit 104 are safe because the voltage to be applied to the internal circuit 109 via the connector 101 and the bypass route BP will not exceed the allowable voltage Vmax.

If the voltage determined in step S206 exceeds the allowable voltage Vmax (YES in step S206), the charging control unit 106 sets the switch 105 from the on state to the off state (step S207). This allows the bypass route BP between the CC terminal 101B and the internal circuit 109 to be set to the non-conductive state before a voltage exceeding the allowable voltage Vmax is applied to the VBUS terminal 101A by the power supply apparatus 120. As a result, the DC coupling between the CC terminal 101B and the internal circuit 109 is disconnected and the AC coupling between the CC terminal 101B and the internal circuit 109 is effective. After the switch 105 is set from the on state to the off state, the communication control unit 104 communicates with the power supply apparatus 120 via the AC coupling and the CC terminal 101B.

In step S208, the communication control unit 104 requests the power supply apparatus 120, via the capacitor 107 (AC coupling) and the CC terminal 101B, to apply the voltage determined in step S206 to the VBUS terminal 101A. This causes a voltage exceeding the allowable voltage Vmax to be applied to the VBUS terminal 101A by the power supply apparatus 120. However, in a period in which the switch 105 is set to the off state, the DC coupling between the CC terminal 101B and the internal circuit 109 is disconnected and the AC coupling between the CC terminal 101B and the internal circuit 109 is effective. Hence, since the internal circuit 109 is protected from the overvoltage by the AC coupling, the voltage detecting unit 103 and the communication control unit 104 are safe even if a short circuit occurs between the VBUS terminal 101A and the CC terminal 101B.

In step S209, the charging control unit 106 charges the battery 110 by the voltage exceeding the allowable voltage Vmax until the battery 110 reaches a fully charged state or until some kind of abnormality is detected. Hence, in the charging operation in step S209, the charging time of the battery 110 can be shortened compared to the charging operation in step S204. As described above, since the internal circuit 109 is protected from the overvoltage by the AC coupling, the voltage detecting unit 103 and the communication control unit 104 are safe even if a short circuit occurs between the VBUS terminal 101A and the CC terminal 101B while charging in step S209.

In step S210, the charging control unit 106 determines whether the voltage of the VBUS terminal 101A is lower than a predetermined voltage. If it is determined that the voltage of the VBUS terminal 101A is not lower than a predetermined voltage (NO in step S210), the charging control unit 106 determines that the power supply of the power supply apparatus 120 is being maintained, and the process returns to step S210 after a predetermined time has elapsed.

If it is determined that the voltage of the VBUS terminal 101A is lower than the predetermined voltage (YES in step S210), the charging control unit 106 determines that the power supply apparatus 120 has been detached from the connector 101, and advances to step S201. The charging control unit 106 notifies the communication control unit 104 that the power supply apparatus 120 has been detached from the connector 101. If the switch 105 is subsequently set from the off state to the on state in step S201, there is a possibility that the charges charged to the capacitor 107 will flow to the communication control unit 104 as an inrush current. However, the communication control unit 104 is protected from the inrush current from the capacitor 107 by the suppressing resistor 108 connected between the capacitor 107 and the communication control unit 104.

Exemplary operations of the electronic apparatus 100 according to the first embodiment will be described next with reference to the timing charts of FIGS. 3A, 3B, and 3C.

Periods T1 to T3, hereinafter, are assumed as the periods in which a short circuit may occur between the VBUS terminal 101A and the CC terminal 101B.

(1) Period T1: A period from inserting plug of the USB Type-C cable to the connector 101 until starting the communication complying with the USB PD standard.

(2) Period T2: A period from starting the communication complying with the USB PD standard until transmitting to the power supply apparatus 120 a request for applying a voltage exceeding the allowable voltage Vmax to the VBUS terminal 101A.

(3) Period T3: A period after the power supply apparatus 120 has been requested to apply a voltage exceeding the allowable voltage Vmax to the VBUS terminal 101A.

An exemplary operation of the electronic apparatus 100 when a short circuit has occurred in the period T1 will be described with reference to the timing chart of FIG. 3A.

In the period T1, the maximum voltage applied to the VBUS terminal 101A is 5 V. Hence, even if a short circuit occurs between the VBUS terminal 101A and the CC terminal 101B in the period T1, the voltage applied to the internal circuit 109 via the CC terminal 101B will not exceed the allowable voltage Vmax. Therefore, the voltage detecting unit 103 and the communication control unit 104 are safe in the period T1. Note that if a short circuit occurs between the VBUS terminal 101A and the CC terminal 101B in the period T1, the voltage of the CC terminal 101B will change to an abnormal value, and the communication control unit 104 will fail to perform communication complying with the USB PD standard (step S202). In this case, the communication control unit 104 determines that the power supply apparatus 120 is not an external apparatus complying with the USB PD standard (NO in step S202). If the power supply apparatus 120 is not an external apparatus complying with the USB PD standard, the voltage to be applied to the VBUS terminal 101A by the power supply apparatus 120 is restricted to 5 V or less since the power supply apparatus 120 is an external apparatus complying with the USB Type-C standard. Hence, the voltage to be applied to the VBUS terminal 101A is restricted to 5 V or less also in the period after the communication complying with the USB PD standard has failed. Even if a short circuit occurs between the VBUS terminal 101A and the CC terminal 101B during the period of steps S203 to S205, the voltage which is to be applied to the internal circuit 109 via the CC terminal 101B and the bypass route BP will not exceed the allowable voltage Vmax. Therefore, the voltage detecting unit 103 and communication control unit 104 are safe.

An exemplary operation of the electronic apparatus 100 when a short circuit occurs in the period T2 will be described with reference to FIG. 3B.

In the period T2, the maximum voltage which is to be applied to the VBUS terminal 101A is 5 V. Hence, even if a short circuit occurs between the VBUS terminal 101A and the CC terminal 101B in the period T2, the voltage which is to be applied to the internal circuit 109 via the CC terminal 101B will not exceed the allowable voltage Vmax. Therefore, the voltage detecting unit 103 and the communication control unit 104 are also safe in the period T2. Note that if a short circuit occurs between the VBUS terminal 101A and the CC terminal 101B in the period T2, the voltage of the CC terminal 101B changes to an abnormal value. In this case, the communication control unit 104 determines (NO in step S206) a voltage (e.g., 5 V) that does not exceed the allowable voltage Vmax as the voltage to be applied to the VBUS terminal 101A by the power supply apparatus 120. Subsequently, the voltage which is to be applied to the VBUS terminal 101A by the power supply apparatus 120 is restricted to a voltage that does not exceed the allowable voltage Vmax. Even if a short circuit occurs between the VBUS terminal 101A and the CC terminal 101B in the period of steps S203 to S205, the voltage which is to be applied to the internal circuit 109 via the CC terminal 101A (101B) and the bypass route BP will not exceed the allowable voltage Vmax. Therefore, the voltage detecting unit 103 and the communication control unit 104 are safe.

An exemplary operation of the electronic apparatus 100 when a short circuit occurs in the period T3 will be described with reference to the timing chart of FIG. 3C.

In the period T3, a voltage exceeding the allowable voltage Vmax is applied to the VBUS terminal 101A.

However, the charging control unit 106 sets the switch 105 from the on state to the off state before the voltage exceeding the allowable voltage Vmax is applied to the VBUS terminal 101A by the power supply apparatus 120 (step S207). In a period in which the switch 105 is set to the off state, the DC coupling between the CC terminal 101B and the internal circuit 109 is disconnected and the AC coupling between the CC terminal 101B and the internal circuit 109 is effective. Since the internal circuit 109 is protected from the overvoltage by the AC coupling, the voltage detecting unit 103 and the communication control unit 104 are safe even when a short circuit occurs between the VBUS terminal 101A and the CC terminal 101B in the period T3.

As described above, according to the first embodiment, if the power supply apparatus 120 is an external apparatus complying with the USB PD standard, the switch 105 can be set to the off state before a voltage exceeding the allowable voltage Vmax is applied to the VBUS terminal 101A by the power supply apparatus 120. As a result, before a voltage exceeding the allowable voltage Vmax is applied to the VBUS terminal 101A by the power supply apparatus 120, the DC coupling between the CC terminal 101B and the internal circuit 109 is disconnected and the AC coupling of CC terminal 101B and the internal circuit 109 is effective. Since the internal circuit 109 is protected from the overvoltage by the AC coupling, the internal circuit 109 connected to the CC terminal 101B can be protected from the overvoltage that is generated from a short circuit between the CC terminal 101B and another terminal (e.g., the VBUS terminal 101A). Furthermore, according to the first embodiment, since the allowable voltage Vmax need not be increased to a voltage exceeding 20 V, it is possible to implement a reduction in the cost of the internal circuit.

Note that the timing to set the switch 105 to the off state is not limited to the timing before the power supply apparatus 120 is requested to apply a voltage exceeding the allowable voltage Vmax to the VBUS terminal 101A. The timing to set the switch 105 to the off state may be set whenever in the period from the point when the power supply apparatus 120 has been determined to be an external apparatus capable of communication complying with the USB PD standard to the point before the voltage exceeding the allowable voltage Vmax is applied to the VBUS terminal 101A. For example, the switch 105 may be set to the off state immediately after the power supply apparatus 120 is requested to apply the voltage exceeding the allowable voltage Vmax to the VBUS terminal 101A. Note that, however, it is preferable to set as much time difference as possible between the point when the switch 105 is set to the off state and the point when the voltage exceeding the allowable voltage Vmax is applied to the VBUS terminal 101A.

Second Embodiment

The second embodiment will be described next with reference to FIGS. 3A, 3B, 3C, 4, 5, 6A, and 6B.

The first embodiment did not describe how a bias voltage is provided to the AC signal that is obtained from the CC terminal 101B via the capacitor 107 when the switch 105 is to be set to the off state. The second embodiment will describe an example in which an appropriate bias voltage is provided to an AC signal that is obtained from the CC terminal 101B via the capacitor 107 when the switch 105 is set to the off state. This kind of arrangement can moderate a situation in which the voltage level of a signal to be input to the internal circuit 109 will be changed after the switch 105 is set to the off state.

Figure 4:
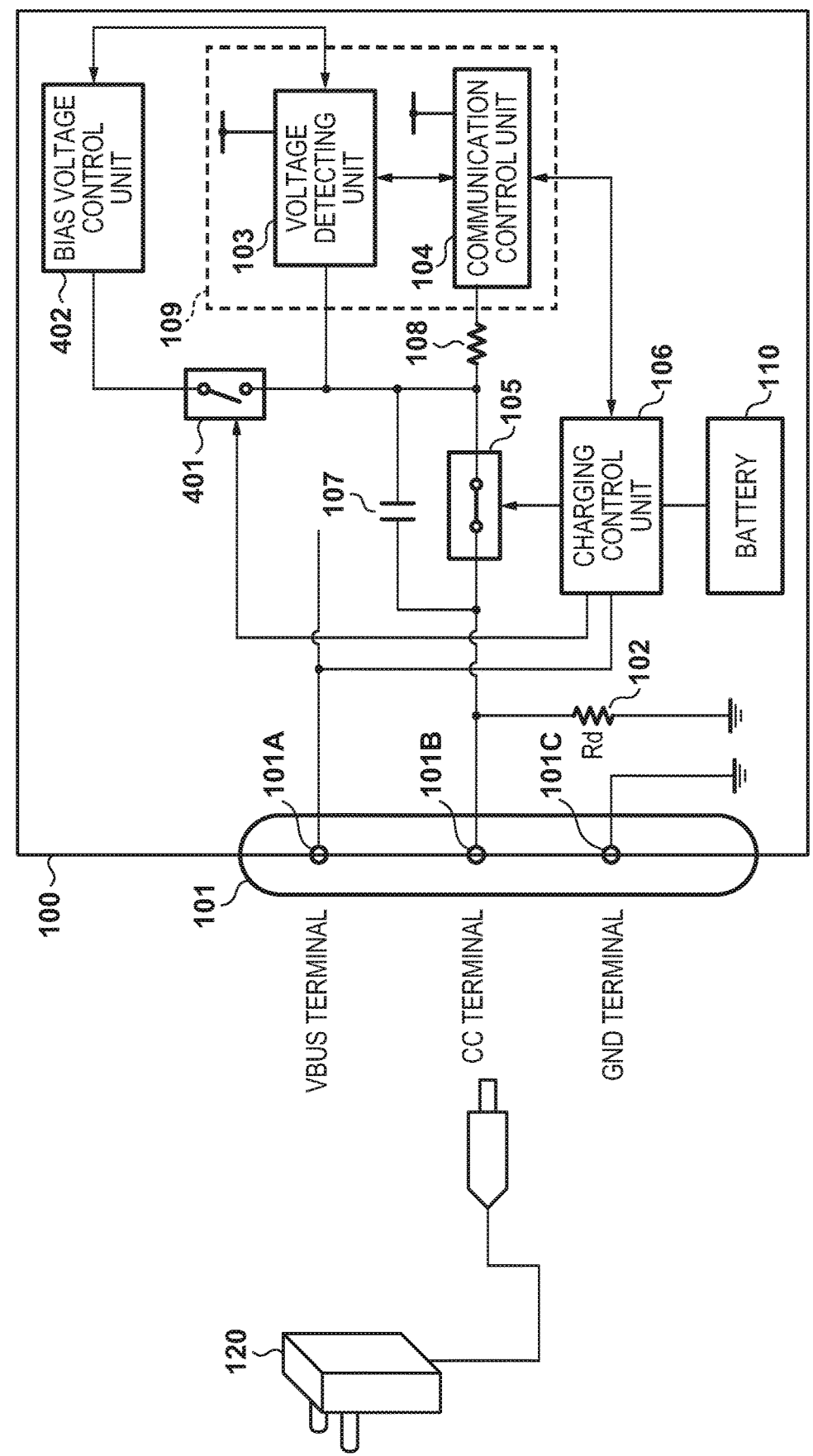
FIG. 4 is a block diagram for illustrating an exemplary arrangement of the electronic apparatus 100 according to a second embodiment.
Figure 5:
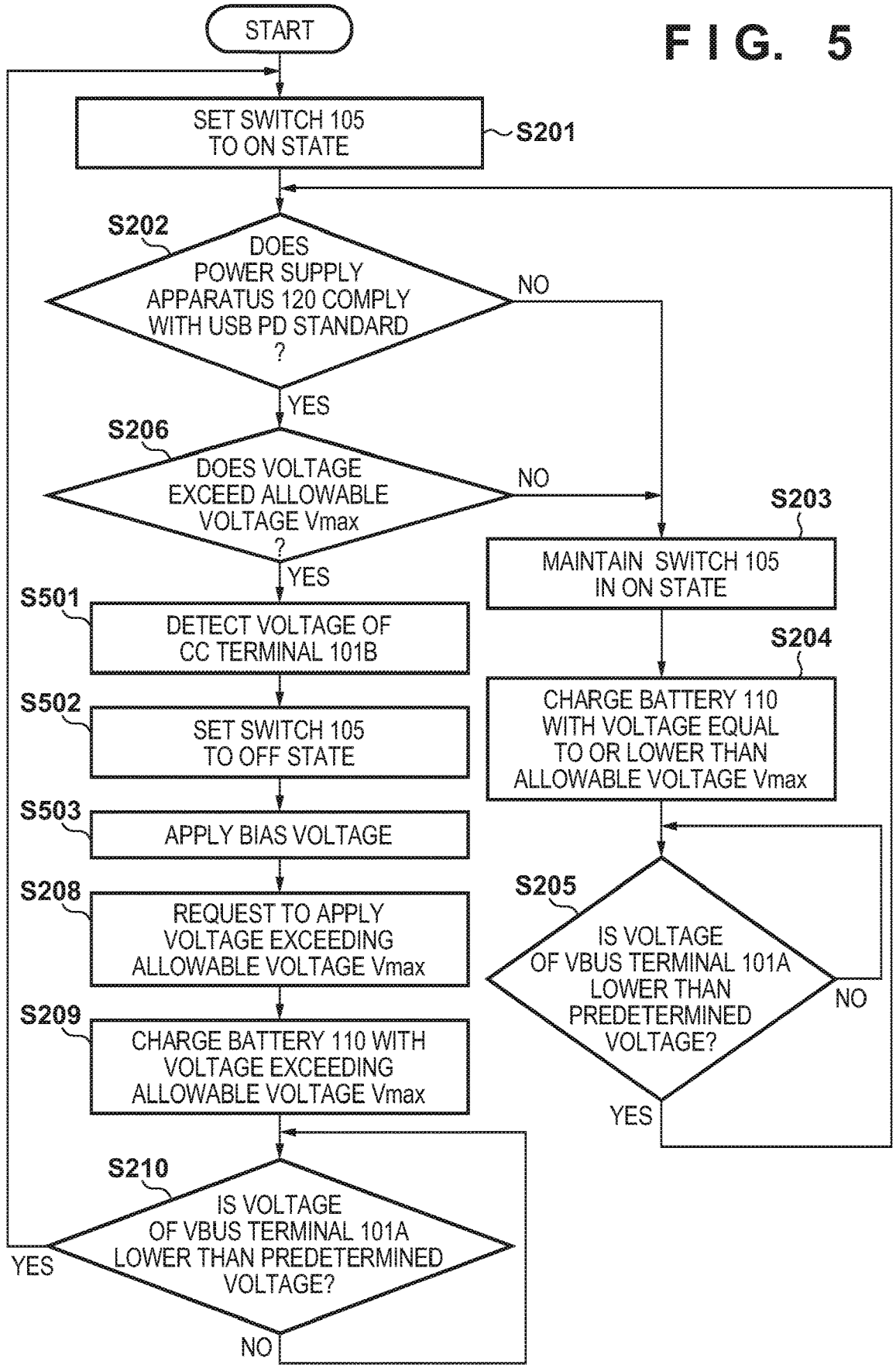
FIG. 5 is a flowchart for illustrating an exemplary operation of the electronic apparatus 100 according to the second embodiment.

FIG. 4 is a block diagram for illustrating an exemplary arrangement of the electronic apparatus 100 according to the second embodiment. FIG. 5 is a flowchart for illustrating an exemplary operation of the electronic apparatus 100 according to the second embodiment. In FIG. 4, the same reference symbols as those in FIG. 1 denote the same components as those described in the first embodiment, and a description thereof is omitted. In FIG. 5, the same step numbers as those in FIG. 2 denote the same processes as those described in the first embodiment, and a description thereof is omitted.

The electronic apparatus 100 according to the second embodiment is different from the electronic apparatus 100 of the first embodiment in that it further includes a switch 401 and a bias voltage control unit 402. Each of the switch 401 and the bias voltage control unit 402 has a hardware arrangement.

The switch 401 is a switch connected between the capacitor 107 and the bias voltage control unit 402. When the switch 401 is set to an on state, a conductive state is set between the capacitor 107 and the bias voltage control unit 402. When the switch 401 is set to an off state, a non-conductive state is set between the capacitor 107 and the bias voltage control unit 402. Statuses of the switch 105 and the switch 401 are controlled by a charging control unit 106. The charging control unit 106 performs control so that the switch 401 is set to the off state when the switch 105 is set to the on state and so that the switch 401 is set to the on state when the switch 105 is set to the off state.

A voltage detecting unit 103 detects the voltage (DC voltage) applied to the CC terminal 101B by a power supply apparatus 120 when the power supply apparatus 120 is not an external apparatus complying with the USB PD standard, the switch 105 is set to the on state and the switch 401 is set to the off state. The communication control unit 104 and the bias voltage control unit 402 are notified of the value indicated by the voltage detected by the voltage detecting unit 103.

The bias voltage control unit 402 generates a bias voltage corresponding to the voltage which was detected by the voltage detecting unit 103 before the switch 105 is set from the on state to the off state. The bias voltage generated by the bias voltage control unit 402 is provided to the AC signal obtained from the CC terminal 101B via the capacitor 107. As a result, a state in which the voltage level of the signal input to the internal circuit 109 is changed after the switch 105 is set to the off state can be moderated.

Figure 6A:
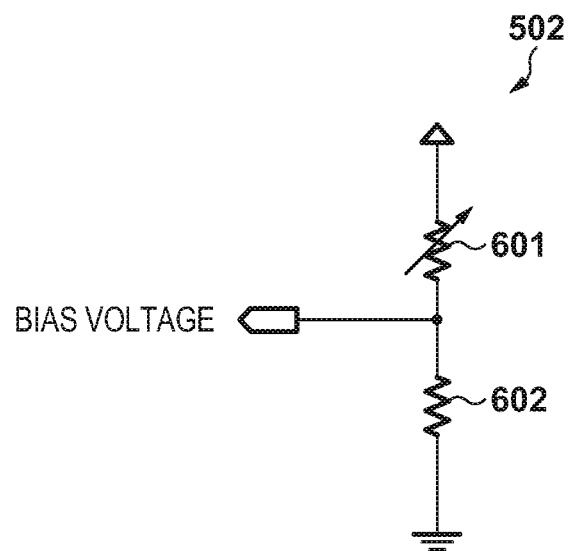
FIG. 6A is a view for illustrating a first example of components included in a bias voltage control unit 402.
Figure 6B:
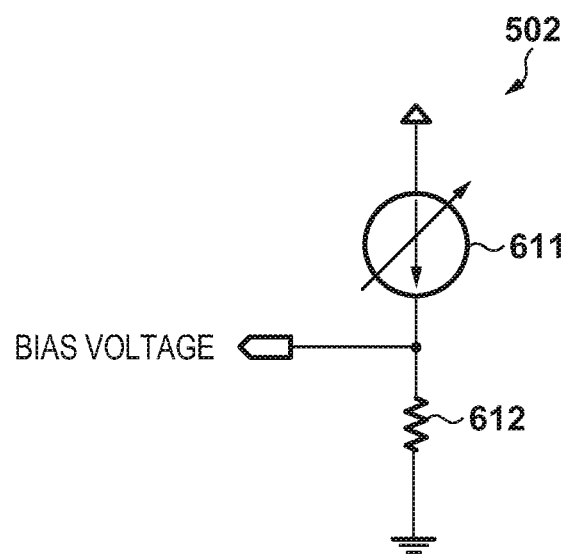
FIG. 6B is a view for illustrating a second example of components included in the bias voltage control unit 402.

Examples of components included in the bias voltage control unit 402 will be described next with reference to FIGS. 6A and 6B.

An example in which the bias voltage control unit 402 includes a variable resistor 601 and a resistor 602 will be described with reference to FIG. 6A. In this example, the bias voltage control unit 402 can adjust the bias voltage generated in the bias voltage control unit 402 by adjusting the resistance value of the variable resistor 601. The bias voltage control unit 402 adjusts the resistance value of the variable resistor 601 based on the voltage detected by the voltage detecting unit 103 before the switch 105 is set from the on state to the off state. As a result, the bias voltage control unit 402 can generate a bias voltage corresponding to the voltage detected by the voltage detecting unit 103.

An example in which the bias voltage control unit 402 includes a constant current source 611 and a resistor 612 will be described with reference to FIG. 6B. In this example, the bias voltage control unit 402 can adjust the output current of the constant current source 611 by adjusting the bias voltage generated in the bias voltage control unit 402. The bias voltage control unit 402 adjusts the output current of the constant current source 611 based on the voltage detected by the voltage detecting unit 103 before the switch 105 is set from the on state to the off state. As a result, the bias voltage control unit 402 can generate a bias voltage corresponding to the voltage detected by the voltage detecting unit 103.

An exemplary operation of the electronic apparatus 100 according to the second embodiment will be described next with reference to the flowchart of FIG. 5. The flowchart of FIG. 5 starts, in the same manner as the flowchart of FIG. 2, when the power switch of the electronic apparatus 100 is set to the on state and power supplied from the battery 110 is supplied to the voltage detecting unit 103, the communication control unit 104, the charging control unit 106, and the other components.

The processes performed in steps S201 to S206 and steps S208 to S210 are the same as the processes performed in steps S201 to S206 and steps S208 to S210 described in the first embodiment. However, in step S201, when the switch 105 is set from the off state to the on state, the charging control unit 106 sets the switch 401 from the on state to the off state. When it is determined that the power supply apparatus 120 is not an external apparatus complying with the USB PD standard (NO in step S202), the charging control unit 106 maintains the switch 105 in the on state and maintains the switch 401 in the off state (step S203). If the voltage determined in step S206 does not exceed the allowable voltage Vmax (NO in step S206), the charging control unit 106 maintains the switch 105 in the on state and maintains the switch 401 in the off state (step S203). If the voltage determined in step S206 exceeds the allowable voltage Vmax (YES in step S206), the charging control unit 106 advances to step S501 instead of step S207.

In step S501, the voltage detecting unit 103 detects the voltage (DC voltage) applied to the CC terminal 101B by the power supply apparatus 120 before the switch 105 is set from the on state to the off state. The bias voltage control unit 402 is notified of the value indicating the voltage detected by the voltage detecting unit 103. Note that although the second embodiment describes an example in which the detection of the voltage performed in step S501 is performed after step S206, the timing to detect the voltage applied to the CC terminal 101B is not limited to this. For example, the detection of the voltage applied to the CC terminal 101B by the power supply apparatus 120 may be performed after step S201 and before step S202 or step S206. Alternatively, the detection of the voltage applied to the CC terminal 101B by the power supply apparatus 120 may be performed in step S202 or step S206.

In step S502, the charging control unit 106 sets the switch 105 from the on state to the off state and sets the switch 401 from the off state to the on state. This sets a bypass route BP between the CC terminal 101B and the internal circuit 109 to a non-conductive state before a voltage exceeding the allowable voltage Vmax is applied to a VBUS terminal 101A by the power supply apparatus 120. As a result, the DC coupling between the CC terminal 101B and the internal circuit 109 is disconnected and the AC coupling between the CC terminal 101B and the internal circuit 109 becomes effective. After the switch 105 has been set from the on state to the off state, the communication control unit 104 will communicate with the power supply apparatus 120 via the AC coupling and the CC terminal 101B.

In step S503, the bias voltage control unit 402 generates a bias voltage corresponding to the voltage detected in step S501. The bias voltage control unit 402 provides the generated bias voltage to the AC signal obtained from the CC terminal 101B via the capacitor 107. After the bias voltage which was generated in step S503 is provided to the AC signal, the communication control unit 104 requests the power supply apparatus 120, via the capacitor 107 and the CC terminal 101B, to apply the voltage which was determined in step S206 to the VBUS terminal 101A (step S208).

Exemplary operations of the electronic apparatus 100 according to the second embodiment will be described next with reference to the timing charts of FIGS. 3A, 3B, and 3C.

In the same manner as those described in the first embodiment, three periods T1 to T3 have been assumed as the respective timings in which a short circuit occurs between the VBUS terminal 101A and the CC terminal 101B. Exemplary operations of the electronic apparatus 100 when a short circuit occurs in each of the periods T1 and T2 are the same as those described in the first embodiment, so a description thereof is omitted.

An exemplary operation of the electronic apparatus 100 when a short circuit occurs in the period T3 will be described with reference to the timing chart of FIG. 3C.

In the period T3, a voltage exceeding the allowable voltage Vmax is applied to the VBUS terminal 101A. However, before a voltage exceeding the allowable voltage Vmax is applied to the VBUS terminal 101A by the power supply apparatus 120, the charging control unit 106 sets the switch 105 from the on state to the off state and sets the switch 401 from the off state to the on state (step S502). In a period in which the switch 105 is set to the off state and the switch 401 is set to the on state, the DC coupling between the internal circuit 109 and the CC terminal 101B is disconnected and the AC coupling between the CC terminal 101B and the internal circuit 109 is effective. Since the internal circuit 109 is protected from the overvoltage by the AC coupling, the voltage detecting unit 103 and the communication control unit 104 are safe even when a short circuit occurs between the VBUS terminal 101A and the CC terminal 101B in the period T3.

As described above, according to the second embodiment, in the same manner as the first embodiment, the internal circuit 109 connected to the CC terminal 101B can be protected from the overvoltage generated by a short circuit between the CC terminal 101B and another terminal (e.g., the VBUS terminal 101A). According to the second embodiment, in the same manner as the first embodiment, it is possible to implement a reduction in the cost of the internal circuit since the allowable voltage Vmax need not be increased to a voltage exceeding 20 V.

Furthermore, according to the second embodiment, the bias voltage control unit 402 can generate a bias voltage corresponding to the voltage detected by the voltage detecting unit 103 before the switch 105 is set from the on state to the off state. The bias voltage control unit 402 can provide, before the switch 105 is set to the off state, an appropriate bias voltage generated in the bias voltage control unit 402 to the AC signal obtained from the CC terminal 101B via the capacitor 107. As a result, a situation in which the voltage level of the signal input to the internal circuit 109 is changed after the switch 105 is set to the off state can be moderated.

Note that the timing to set the switch 105 to the off state and the switch 401 to the on state is not limited to the timing before applying a voltage exceeding the allowable voltage Vmax to the VBUS terminal 101A is requested to the power supply apparatus 120. The timing to set the switch 105 to the off state and the switch 401 to the on state may be set whenever in the period from the point when the power supply apparatus 120 is determined as an external apparatus capable of communication complying with the USB PD standard to the point before a voltage exceeding the allowable voltage Vmax is applied to the VBUS terminal 101A. For example, the switch 105 may be set to the off state and the switch 401 may be set to the on state immediately after the power supply apparatus 120 has been requested to apply a voltage exceeding the allowable voltage Vmax to the VBUS terminal 101A. Note that, however, it is preferable to set as much time difference as possible between the point when the switch 105 is set to the off state and the switch 401 is set to the on state and the point when the voltage exceeding the allowable voltage Vmax is applied to the VBUS terminal 101A.

While aspects of the present invention are described with reference to exemplary embodiments, it is to be understood that aspects of the invention are not limited to the exemplary embodiments. The scope of the following claims is to be accorded the broadest interpretation so as to encompass all modifications and equivalent structures.

This application claims priority from Japanese Patent Application No. 2016-256764, filed Dec. 28, 2016, which is hereby incorporated by reference herein in its entirety.

What is claimed is:

1. An electronic apparatus comprising:
   a first terminal that receives power supplied from an external apparatus;
   a second terminal that is used to determine a power supply capability of an external apparatus;
   an internal circuit that includes a communication control unit that communicates with an external apparatus via the second terminal and a voltage detecting unit that detects a DC voltage applied to the second terminal;
   a capacitor that forms an AC coupling between the internal circuit and the second terminal;
   a route that bypasses the capacitor;
   a switch that causes the route to switch to a conductive state or a non-conductive state;
   a control unit that controls the switch by determining whether a first voltage applied to the first terminal by the external apparatus exceeds a second voltage which can be applied to the internal circuit via the second terminal; and
   a generation unit that generates, based on a voltage detected by the voltage detecting unit, a bias voltage which is provided to an AC signal obtained from the second terminal via the capacitor.

2. The electronic apparatus according to claim 1, wherein the control unit controls the switch so that the route maintains the conductive state when the first voltage does not exceed the second voltage.

3. The electronic apparatus according to claim 1, wherein the control unit controls the switch so that the route is set to the non-conductive state when the first voltage exceeds the second voltage.

4. The electronic apparatus according to claim 1, wherein the power supply capability of the external circuit is determined by the DC voltage detected by the voltage detecting unit.

5. The electronic apparatus according to claim 1, wherein the control unit is capable of charging a battery with power supplied from the external apparatus via the first terminal.

6. The electronic apparatus according to claim 1, wherein the control unit controls the switch so that the route maintains the conductive state, in a case where the external apparatus is not an apparatus complying with Universal Serial Bus Power Delivery standard.

7. The electronic apparatus according to claim 1, wherein the control unit controls the switch so that the route maintains the conductive state when the first voltage does not exceed the second voltage, in a case where the external apparatus is an apparatus complying with Universal Serial Bus Power Delivery standard.

8. The electronic apparatus according to claim 1, wherein the control unit controls the switch so that the route is set to the non-conductive state when the first voltage exceeds the second voltage, in a case where the external apparatus is an apparatus complying with Universal Serial Bus Power Delivery standard.

9. An electronic apparatus comprising:
   a first terminal that receives power supplied from an external apparatus;
   a second terminal that is used to determine a power supply capability of an external apparatus;
   an internal circuit that includes a communication control unit that communicates with an external apparatus via the second terminal;
   a capacitor that forms an AC coupling between the internal circuit and the second terminal;
   a route that bypasses the capacitor;
   a switch that causes the route to switch to a conductive state or a non-conductive state; and
   a control unit that controls the switch by determining whether a first voltage applied to the first terminal by the external apparatus exceeds a second voltage which can be applied to the internal circuit via the second terminal,
   wherein the control unit requests, when the first voltage exceeds the second voltage, the external apparatus to apply the first voltage to the first terminal after controlling the switch to set the route to the non-conductive state.

10. The electronic apparatus according to claim 9, wherein the control unit controls the switch so that the route maintains the conductive state when the first voltage does not exceed the second voltage.

11. The electronic apparatus according to claim 9, wherein the control unit controls the switch so that the route is set to the non-conductive state when the first voltage exceeds the second voltage.

12. The electronic apparatus according to claim 9, wherein the internal circuit further includes a voltage detecting unit that detects a DC voltage applied to the second terminal.

13. The electronic apparatus according to claim 12, wherein the power supply capability of the external circuit is determined by the DC voltage detected by the voltage detecting unit.

14. The electronic apparatus according to claim 12, further comprising a generation unit that generates, based on a voltage detected by the voltage detecting unit, a bias voltage which is provided to an AC signal obtained from the second terminal via the capacitor.

15. The electronic apparatus according to claim 9, wherein the control unit is capable of charging a battery with power supplied from the external apparatus via the first terminal.

16. The electronic apparatus according to claim 9, wherein the control unit controls the switch so that the route maintains the conductive state, in a case where the external apparatus is not an apparatus complying with Universal Serial Bus Power Delivery standard.

17. The electronic apparatus according to claim 9, wherein the control unit controls the switch so that the route maintains the conductive state when the first voltage does not exceed the second voltage, in a case where the external apparatus is an apparatus complying with Universal Serial Bus Power Delivery standard.

18. The electronic apparatus according to claim 9, wherein the control unit controls the switch so that the route is set to the non-conductive state when the first voltage exceeds the second voltage, in a case where the external apparatus is an apparatus complying with Universal Serial Bus Power Delivery standard.

19. A method comprising:
- causing a second terminal of an electronic apparatus and an internal circuit of the electronic apparatus to be conductive and determining a first voltage to be applied to a first terminal of the electronic apparatus by an external apparatus, wherein the electronic apparatus includes the first terminal, the second terminal, and the internal circuit, the first terminal is used by the electronic apparatus to receive power supplied from the external apparatus, the second terminal is used by the electronic apparatus to determine a power supply capability of the external device, and the internal circuit includes a communication control unit that communicates with the external apparatus via the second terminal and a voltage detecting unit that detects a DC voltage applied to the second terminal;
- determining whether the first voltage applied to the first terminal by the external apparatus exceeds a second voltage that can be applied to the internal circuit via the second terminal;
- controlling, when the first voltage does not exceed the second voltage, a switch so as to maintain a conductive state of a route used to bypass a capacitor which forms an AC coupling between the internal circuit and the second terminal, wherein the switch is used to cause the route to switch to the conductive state or a non-conductive state;
- controlling, when the first voltage exceeds the second voltage, the switch so as to set the route to the non-conductive state; and
- generating, based on a voltage detected by the voltage detecting unit, a bias voltage which is provided to an AC signal obtained from the second terminal via the capacitor.

20. A method comprising:
- causing a second terminal of an electronic apparatus and an internal circuit of the electronic apparatus to be conductive and determining a first voltage to be applied to a first terminal of the electronic apparatus by an external apparatus, wherein the electronic apparatus includes the first terminal, the second terminal, and the internal circuit, the first terminal is used by the electronic apparatus to receive power supplied from the external apparatus, the second terminal is used by the electronic apparatus to determine a power supply capability of the external device, and the internal circuit includes a communication control unit that communicates with the external apparatus via the second terminal;
- determining whether the first voltage applied to the first terminal by the external apparatus exceeds a second voltage that can be applied to the internal circuit via the second terminal;
- controlling, when the first voltage does not exceed the second voltage, a switch so as to maintain a conductive state of a route used to bypass a capacitor which forms an AC coupling between the internal circuit and the second terminal, wherein the switch is used to cause the route to switch to the conductive state or a non-conductive state;
- controlling, when the first voltage exceeds the second voltage, the switch so as to set the route to the non-conductive state; and
- requesting, when the first voltage exceeds the second voltage, the external apparatus to apply the first voltage to the first terminal after controlling the switch to set the route to the non-conductive state.

* * * * *